Dec. 6, 1955  G. W. BABCOCK ET AL  2,726,115
UNLOADING APPARATUS
Filed May 22, 1953  2 Sheets-Sheet 1
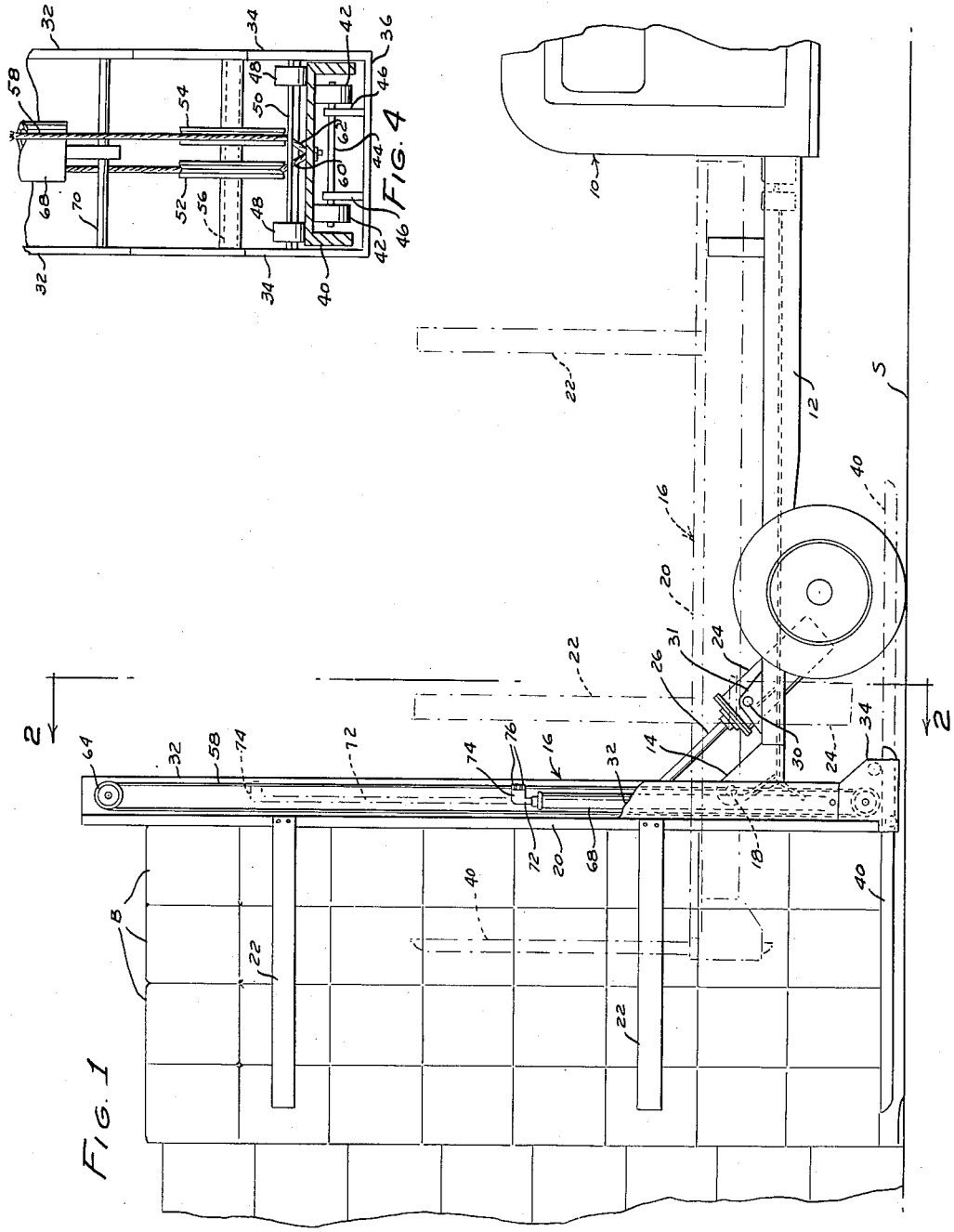
INVENTOR.
WILBER S. BABCOCK
GEORGE W. BABCOCK
BY
McMorrow, Berman + Davidson
ATTORNEYS

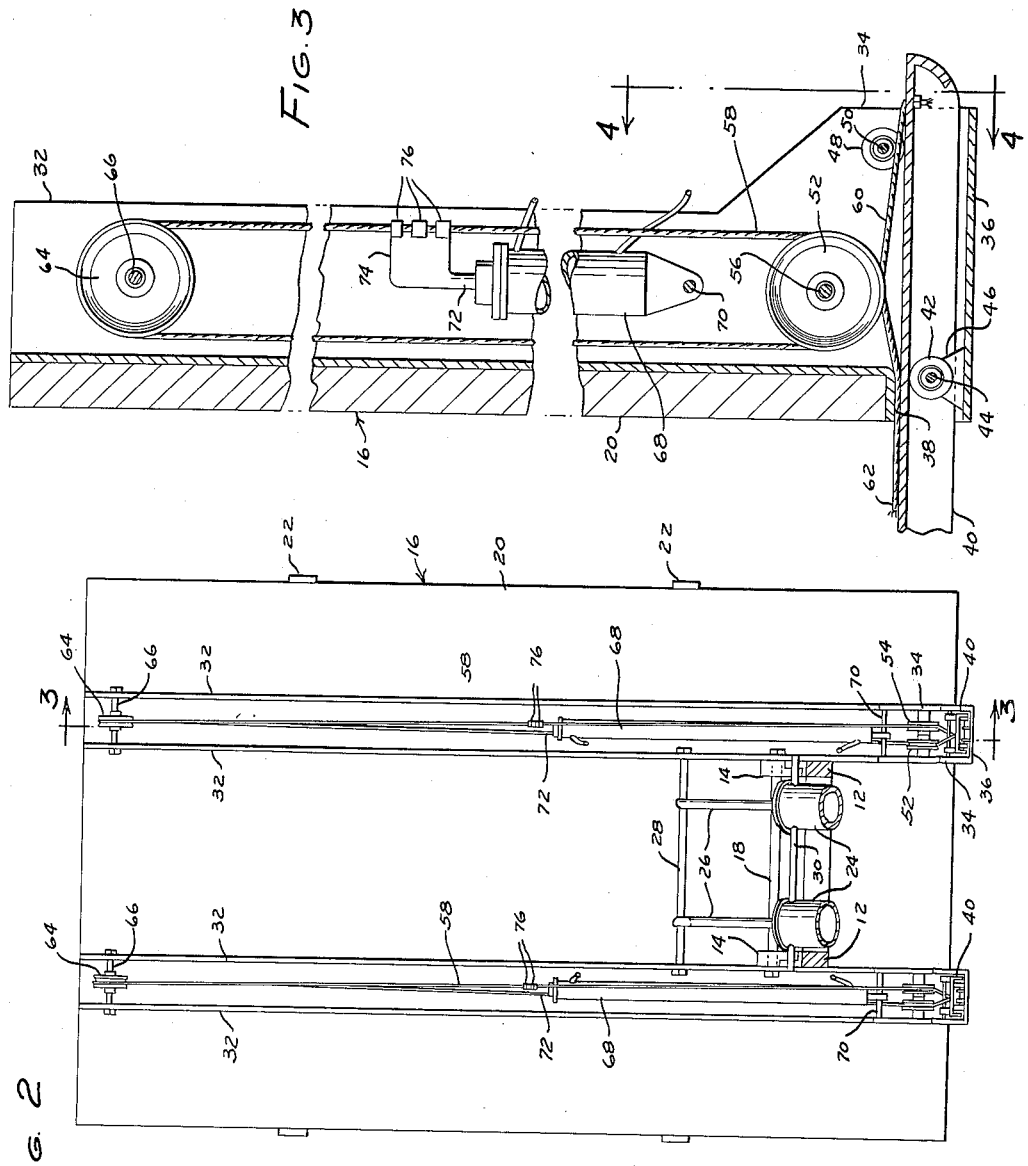

United States Patent Office 2,726,115
Patented Dec. 6, 1955

2,726,115

UNLOADING APPARATUS

George W. Babcock and Wilber S. Babcock,
Lancaster, Calif.

Application May 22, 1953, Serial No. 356,678

1 Claim. (Cl. 298—23)

In the operation of hauling and stacking baled hay, it is the general practice to first rake the hay or straw into long rows, after which the material is picked up by a hay press. The hay press forms the material into bales, which are dropped upon the ground as the hay press moves along the rows. Thereafter, the bales are picked up and stacked upon a flat bed truck or wagon. The load is then taken to the stack location, and the bales are piled, one at a time and by hand, in a stack.

The broad object of the present invention is to provide unloading or stacking apparatus which is particularly designed to eliminate the last-named operation, namely, the removal of the bales from the bed of the vehicle and the stacking of said bales after said removal.

Summarized briefly, the apparatus which we have devised to accomplish the above stated object includes a bed hingedly mounted upon a vehicle frame for swinging movement between substantially vertical and substantially horizontal positions. When in its horizontal position, the bed is usable in the same manner as the bed of a conventional, flat bed truck or wagon. Thus, the bales can be loaded upon the horizontally disposed bed in the regular manner, for transportation to the stack location. The invention, summarized further, includes support arms slidably mounted upon the bed at one end thereof for movement to extended and retracted positions respectively, along lines normal to the plane of the bed. The support arms, when in their extended position with the bed vertically disposed, are disposed in supporting relationship to the bales carried by the bed, said bales being stacked upon the support arms in this relationship of the components of the structure. Means is incorporated in the structure, in this regard, that is effective to retract the support arms out of a load-supporting position, and as a result, the load is deposited, in a stack, upon the supporting surface. The means for retracting and extending the support arms, as well as the means for swinging the bed between its substantially vertical and horizontal positions, is preferably of the hydraulic, double acting type, for the purpose of providing a proper control upon the movement of these main components of the assembly.

Other objects will appear from the following description, the claim appended thereto, and from the annexed drawings, in which like reference characters designate like parts throughout the several views, and wherein:

Figure 1 is a fragmentary side elevational view of a conventional truck, equipped with a stacking apparatus formed in accordance with the present invention, the dotted lines showing the stacking apparatus in its horizontal position and the full lines showing the apparatus in its vertical position, in supporting relationship to a quantity of bales to be stacked;

Figure 2 is a sectional view on line 2—2 of Figure 1;

Figure 3 is a greatly enlarged, longitudinal sectional view on line 3—3 of Figure 2, showing the slidable support arms and the means for retracting and extending the same, portions being broken away; and Figure 4 is a sectional view on line 4—4 of Figure 3.

In the illustrated example of the invention, the stacking apparatus has been illustrated as being mounted upon the frame of a conventional truck 10. However, it will be apparent that the apparatus could, as well, be mounted upon a trailer of the type drawn behind a traction vehicle, such as a tractor or truck.

In any event, the vehicle associated with the stacking apparatus includes a frame having elongated, generally horizontal side frame members 12 terminating, at their rear ends, in upwardly extending hinge brackets 14.

The stacking apparatus has been designated generally at 16, and is hinged to the frame by means of a horizontally disposed hinge pin 18 extending between brackets 14. The stacking apparatus, by reason of this connection to the frame, is swingable between a substantially horizontal position shown in dotted outline in Figure 1, and a substantially vertical position shown in full lines in the same figure.

The apparatus, in the illustrated example of the invention, is provided with a rectangular, flat platform 20, which platform, in the horizontal position of the apparatus, forms a bed for the truck on which objects such as bales B of hay or straw can be loaded in the usual manner. The platform or bed 20, so as to protect the bales from falling off the same accidentally, are equipped with the side stakes 22, these being spaced longitudinally of the platform at selected locations thereupon.

Means is provided for swinging the apparatus between the horizontal and vertical positions thereof. Said means includes, in the illustrated example of the invention, a pair of parallel hydraulic cylinders 24 (Figures 1 and 2) having pistons 26 pivotally connected at their outer ends to a cross bar 28 carried by the platform or bed 20, and extending transversely of and below said platform. The cylinders 24 are mounted upon the rear end portion of the vehicle frame for rockable movement about a common axis extending transversely of the frame and cylinders, a rock shaft 30 being provided for this purpose with the ends of the rock shaft being mounted in rock shaft support brackets 31 upstanding from the rear end portions of the side members of the frame.

The hydraulic means for adjusting the platform to and from its vertical position is of the double acting type, in a preferred embodiment of the invention. The purpose of this arrangement is to cause positive force to be exerted, in swinging the platform upwardly or downwardly. It will be understood, in this regard, that the hoist means so defined must necessarily be different from that utilized in connection with an ordinary dump truck hoist, for example, in that the double acting lifting and lowering mechanism must be such as would first lift the load to a vertical position, and then pull the bed or platform back to its horizontal position.

In any event, it will be readily appreciated that although we have not diagrammed the hydraulic circuit that might be used, it would be well within the skill of those working regularly in the art to provide a suitable circuit, for controlling accurately the movement of the bed between its full and dotted line positions of Figure 1.

Welded or otherwise fixedly secured to the underside of the bed 20, and extending longitudinally of the bed, are transversely spaced pairs of reinforcing beams 32. Beams 32 not only serve to reinforce the flat bed 20, but also serve to provide guideways for pulley and cable assemblies to be described hereinafter.

At the rear end of the bed, the beams 32 are provided with widened portions 34, the widened portions of the beams of each pair being connected by a bight 36 extending transversely therebetween. As shown in Figure 3, an opening 38 is defined between the bights 36 and the adjacent rear end edge of the bed 20, and slidably mounted within the resultant openings are elongated support arms 40. The support arms 40 slide along lines normal to the plane of the bed 20, as will be readily noted by reference to the full and dotted line positions of the support arms 40 shown in Figure 1. The support arms can be moved to their extended, full line positions before the bed 20 is swung upwardly to its full line position, and it will be seen that in this relationship of the parts, the support arms 40 will take on the weight of the load of bales B. Thereafter, retraction of the support arms 40 to their dotted line positions will be effective to deposit the bales in a stack upon an adjacent supporting surface S.

The support arms 40 are guided in their slidable movement by means of sets of rollers carried by the widened portions 34 of the beams 32. Thus, there is provided (Figure 4) a lower set of rollers 42, the rollers 42 being rotatably mounted upon a shaft 44 carried by upstanding roller support brackets 46 mounted upon the bight 36. Upper guide rollers 48 overlie the support arm 40, and rotate on a transversely extending shaft 50 journaled at its opposite ends in the respective widened portions 34 of the associated beams 32. As shown in Figure 3, the set of rollers 42 is spaced longitudinally of the line of sliding movement of the associated arm 40, from the set of rollers 48, it having been found that this particular arrangement effectively supports the arms 40 in their extended and retracted positions.

Immediately above each support arm, there is provided a pair of closely spaced pulleys 52, 54, mounted for rotation independently of one another upon a common pulley shaft 56 extending between the widened end portions 34. Suitable spacer sleeves are provided upon the shaft 56, to maintain the proper spaced relationship of the pulleys relative to one another and to the widened end portions 34. A single cable 58 is provided in association with each support arm 40, the cable 58 extending longitudinally of and between the support beams 32 of each pair of support beams. At the end of the beams remote from the support arms 40, the cable 58 is trained about a pulley 64 mounted upon a shaft 66 extending between the beams.

The ends of each cable 58 are connected to opposite ends of the support arm 40 associated therewith, one end 60 of the cable being secured to the inner end of the support arm 40 associated therewith, that is, that end of the support arm shown at the right in Figures 1 and 3, and the other end 62 of the same cable being secured to the outer end of the support arm, shown at the left in Figure 1.

Means is provided for imparting movement in opposite directions to the cables 58, for the purpose of slidably adjusting the support arms 40 to retracted and extended positions respectively. To this end, a hydraulic cylinder 68 is provided for each arm 40, said cylinder 68 being disposed between the beams 32 of each pair of beams as best shown in Figure 2. At one end, the cylinder 68 is pivotally connected to a cross bar 70 extending between the associated beams 32. The piston 72 of the cylinder projects from the other end thereof, and at its outer end, has a laterally extended, flat clamp plate 74 terminating in clamping fingers 76 that are grippingly engaged with the associated cable 58. It will be seen that movement of each piston rod 72 to the dotted line position shown in Figure 1 will be effective to slidably adjust the support arm 40 to the dotted line position of Figure 1. Conversely, retraction of the piston rod 72 to its full line position in the same figure of the drawing will be effective to shift the support arm 40 to its extended, full line position.

The cylinders 68, like the cylinders 24, are of the double acting type, so as to exert positive force under controlled conditions, effective for adjusting the cable 58 in opposite directions, as desired.

In use of the apparatus, it will be understood that with the bed 20 horizontally disposed, the truck or trailer can be loaded with objects such as bales B of hay or straw. Thereafter, on arrival at the stack location, the hydraulic means can be operated to swing the bed to the vertical position thereof. It will be understood that previously, the support arms 40 will have been adjusted to their extended positions.

As a result, the bales B will be supported upon the extended support arms 40. Subsequently, retraction of the support arms 40 in the manner discussed previously herein will be effective to deposit the bales in a stack.

The apparatus can of course be used for stacking or unloading objects other than those shown.

It is believed apparent that the invention is not necessarily confined to the specific use or uses thereof described above, since it may be utilized for any purpose to which it may be suited. Nor is the invention to be necessarily limited to the specific construction illustrated and described above, since such construction is only intended to be illustrative of the principles of operation and the means presently devised to carry out said principles, it being considered that the invention comprehends any minor change in construction that may be permitted within the scope of the appended claim.

What is claimed is:

Stacking apparatus comprising, in combination with a vehicle frame, a bed hingedly connected to the frame to swing between substantially horizontal and substantially vertical positions, said bed including a flat platform and a pair of reinforcing beams extending longitudinally of the platform and spaced transversely thereof, said beams being of channel formation to define elongated housings extending adjacent the platform; hydraulic means connected between the bed and frame for shifting the bed between said positions thereof, each of said beams having a transverse opening at one end; a pair of support arms mounted in said openings for movement in the direction of their lengths to extended and retracted positions in respect to a load supported on the bed along lines normal to the plane of the platform; a cable for each support arm connected at its ends to its associated arm at locations spaced longitudinally of the arm; pulleys mounted in the ends of each housing, said cable being trained about said pulleys for disposition of a portion of each cable longitudinally of its associated housing; a hydraulic cylinder on each housing secured at one end to the housing and extending longitudinally of the housing; and a piston working in each cylinder and fixed to said cable portion for shifting the cable in opposite directions under the control of an operator to retract and extend the support arms in each position of the bed.

References Cited in the file of this patent

UNITED STATES PATENTS

| | | |
|---|---|---|
| 1,526,993 | Luce | Feb. 17, 1925 |
| 2,232,197 | Anthony | Feb. 18, 1941 |
| 2,308,648 | De Vry et al. | Jan. 19, 1943 |
| 2,598,865 | Turner | June 3, 1952 |
| 2,652,164 | Tipps | Sept. 15, 1953 |